(No Model.) 2 Sheets—Sheet 1.
N. HUNT.
LATHE FOR TURNING SPHERICAL SURFACES.
No. 338,749. Patented Mar. 30, 1886.
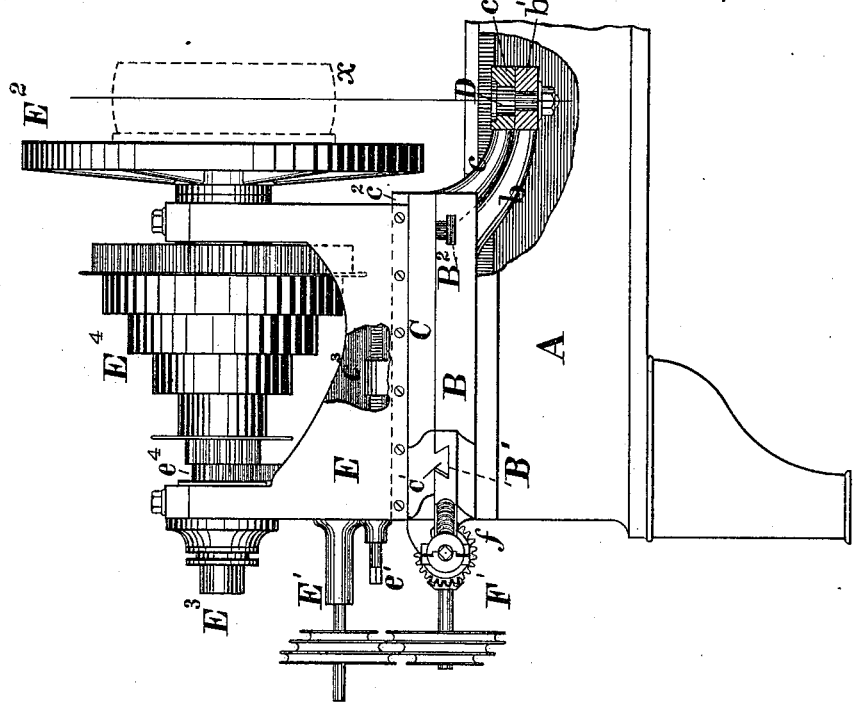
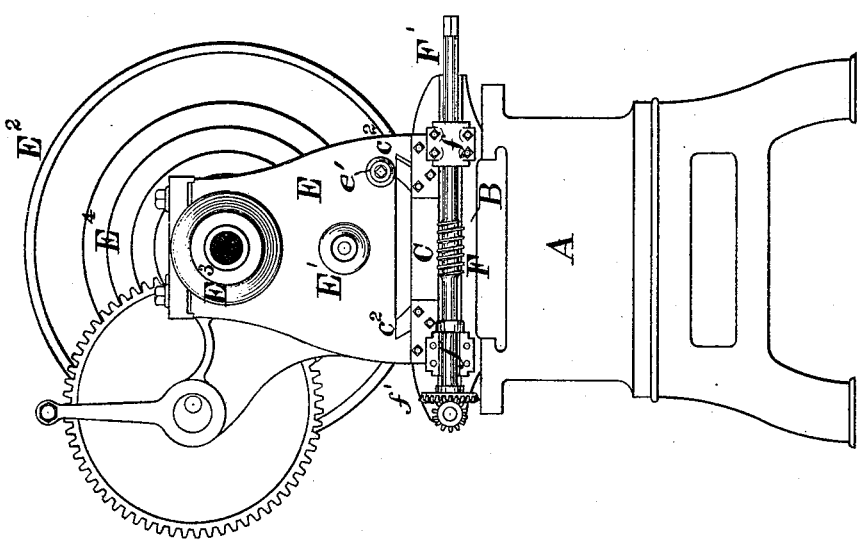
Witnesses
George H. Howard
W. T. Cole
Inventor
Nathan Hunt,
by Collier & Bell,
attys.

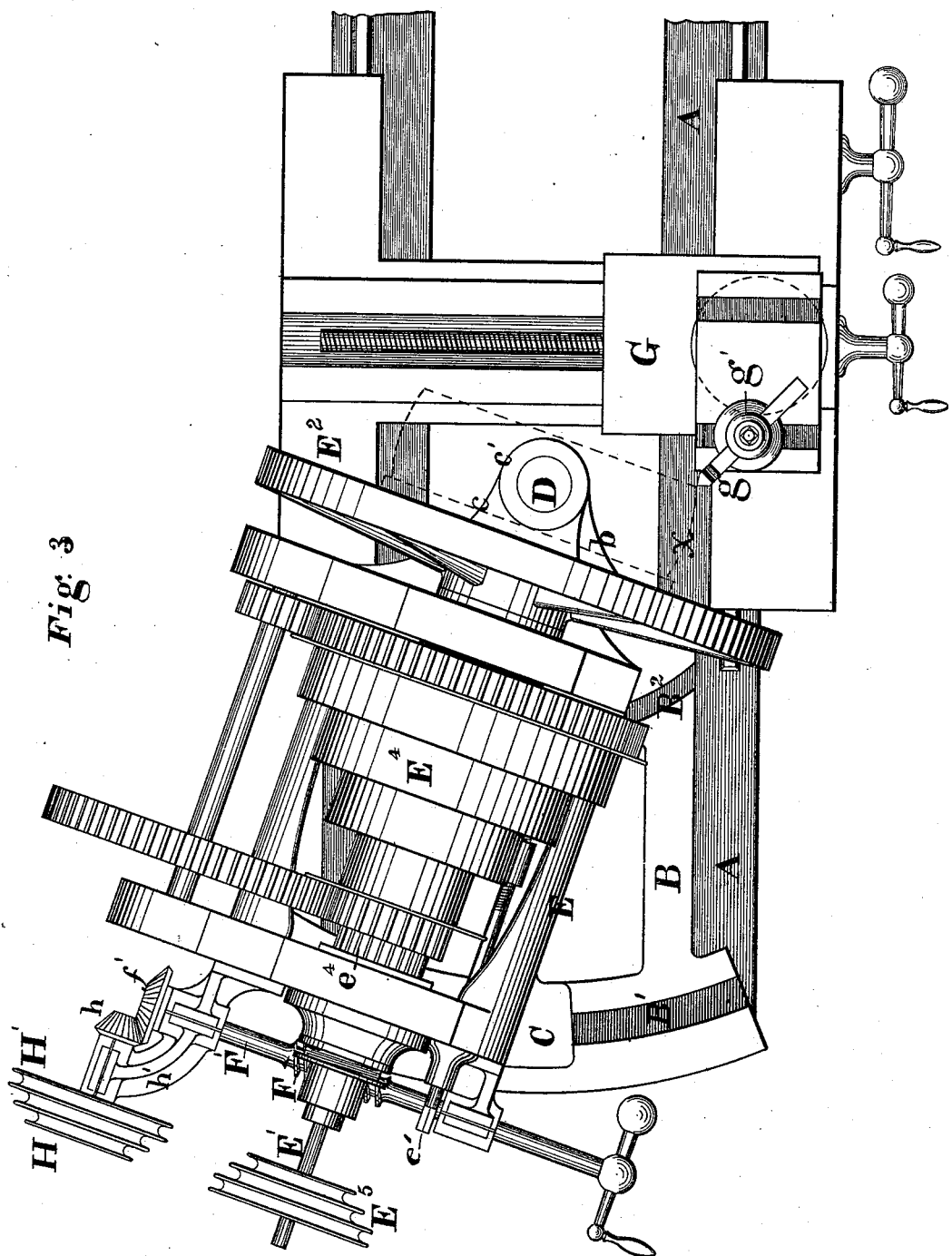

UNITED STATES PATENT OFFICE.

NATHAN HUNT, OF SALEM, OHIO, ASSIGNOR OF ONE-HALF TO THE BUCKEYE ENGINE COMPANY, OF SAME PLACE.

LATHE FOR TURNING SPHERICAL SURFACES.

SPECIFICATION forming part of Letters Patent No. 338,749, dated March 30, 1886.

Application filed August 9, 1883. Serial No. 103,258. (No model.)

*To all whom it may concern:*

Be it known that I, NATHAN HUNT, of Salem, in the county of Columbiana and State of Ohio, have invented certain new and useful Improvements in Lathes for Turning Spherical Surfaces, of which improvements the following is a specification.

The object of my invention is to provide a lathe of such construction and capacity of adjustment as to be adapted to the accurate turning and boring of spherical surfaces of different desired radii, as well as to ordinary service in the finishing of cylindrical surfaces, as may be required, to which ends my improvements consist in certain novel devices and combinations of mechanism, hereinafter fully set forth.

In the accompanying drawings, Figure 1 is an end view in elevation of a lathe embodying my invention; Fig. 2, a side view, partly in section, of so much of the same as is necessary to illustrate the subject-matter; and Fig. 3 a plan or top view.

To carry out my invention, I securely attach to the top of the bed A of the lathe, at one of the ends thereof, a plate, B, which may be either a separate piece connected to the lathe-bed, as in the instance illustrated, or specially, in the case of lathes of small size, may be cast upon the bed. An outwardly and downwardly projecting supporting-arm, $b$, having a pivot-bearing, $b'$, at its outer end, is cast upon or secured to the fixed plate B; or where said plate is cast upon the lathe-bed, a transverse bar on said bed may be employed to support the pivot-bearing.

A movable plate, C, which is fitted to receive and sustain a lathe-head, as presently to be described, is mounted upon the fixed plate B, and is coupled by a pivot-pin, D, passing through a bearing, $c'$, on the end of an arm, $c$, at the inner end of the plate C, to the pivot-bearing $b'$ of the plate B, the plate C being thus adapted to be moved upon the plate B about the axis of the pivot-pin D, which is located forward of the face-plate or chuck of the lathe-head and in the plane of the axis or spindle thereof. A dovetailed groove, B', and a T-shaped slot, $B^2$, each of which is curved to a radius the center of which is located in the axial line of the pivot-pin D, are formed in the plate B adjacent to its outer and inner ends, respectively, and to admit of the rotation of the plate C to the desired extent around the pivot-pin D, while preventing movement of said plate in any other direction, the plate C is maintained in contact with the plate B at its outer end by a dovetailed tongue, C', curved correspondingly with and fitting in the groove B', and at its inner end by bolts, the heads of which fit in the slot $B^2$, and which are held by nuts upon their upper ends above the plate C.

A lathe-head, E, provided with reverse gearing to impart rotation to a shaft, E', in the ordinary manner, as for feeding the carriage, for which purpose it is used when desired, is mounted upon longitudinal dovetailed ways $c^2$ on the plate C, so as to be movable and adjustable longitudinally thereon relatively to the pivot-pin D, without having the capacity of movement in any other direction. The movement and adjustment of the lathe-head are by preference effected by an adjusting-screw, $e'$, mounted in bearings in the head E, and engaging a nut, $c^3$, rigidly secured to the plate C.

The piece of metal to be operated on, which in this instance is a disk, $x$, whose periphery is to be finished to the form of a true spherical zone, and which is shown in dotted lines in Figs. 2 and 3, is secured to a face-plate, $E^2$, on the lathe-spindle $E^3$, which is rotated through cone-pulleys $E^4$ in the ordinary manner. The cutting-tool $g$ is secured in a tool-post, $g'$, on a carriage, G, which is mounted on ways on the lathe-bed A, and is provided with the usual mechanism for imparting transverse feed to the tool, and the carriage is adjusted in such position upon the ways that the tool shall be in line with the desired equatorial plane of the zone to be finished, which in the instance shown coincides with its center. The plate C and the head E which it carries, being then caused to oscillate about the axis of the pivot-pin D with a velocity sufficient to give the proper feed to the cutting-tool, the periphery of the disk $x$ will be turned into the desired form of a truly-spherical zone.

The automatic oscillation of the movable plate C and lathe-head E about the pivot-pin D may be effected by the following mechanism: A worm or tangent screw, F, is formed on a shaft, F', which is mounted in bearings $f$ on the outer end of the plate C and engages a series of teeth formed on the outer end of the plate B. A bevel-gear, $f'$, on the shaft F' engages a corresponding pinion, $h$, on a shaft, H, mounted in a bearing, $h'$, on the plate C, parallel to the shaft E' of the lathe-head, and rotated by a belt passing around a cone-pulley, H', on the shaft H, and a similar cone-pulley, $E^5$, on the shaft E'. The shaft E' is rotated through a reversing-train from a pinion, $e^4$, on the lathe-spindle in the usual manner.

By securely tightening the tongue C' in the groove B' by a gib, clamping the bolts in the slot $B^2$, disconnecting the driving-belt, connecting the cone-pulleys H' and $E^5$, and connecting the cone-pulley $E^5$ with an ordinary carriage-feeding device, the lathe may be used in the ordinary manner for boring and turning straight holes and cylindrical surfaces, or for giving any desired taper in either direction, according as the lathe-spindle is fixed in line with or at an angle to the ways of the lathe-bed.

I am aware that head-stocks made adjustable by being pivoted to the bed of the lathe have been known and used prior to the date of my invention, and such therefore I do not broadly claim. I also disclaim, broadly, a combination in which the head-stock is pivoted at its forward end to the bed and provided with means of adjustment, so that the outer end may be swung to the right or left of the center line, the head-stock being guided by slotted segments working upon studs fixed to the bed.

My invention includes and is limited to a combination including a plate separate from the bed moving upon a fixed axis and carrying a lathe-head adapted to be moved to and from the pivot.

I claim as my invention and desire to secure by Letters Patent—

1. In a lathe for turning spherical forms, the combination, substantially as set forth, of a lathe-bed, a fixed plate having a projection extending forward of the face-plate or chuck of the lathe-head and in the plane of its axis or spindle, a movable plate pivoted to said projection, and a lathe-head mounted upon the said movable plate and adapted to move toward and from the axis of the pivot.

2. In a lathe for turning spherical forms, the combination, substantially as set forth, of a lathe-bed, a fixed plate having a projection extending forward of the face-plate or chuck of the lathe-head and in the plane of its axis or spindle, a movable plate pivoted to said projection, a lathe-head mounted upon said movable plate, and the described mechanism for moving and adjusting the lathe-head upon said movable plate toward and from the axis of the pivot.

3. In a lathe for turning spherical forms, the combination, substantially as set forth, of a lathe-bed, a fixed plate having a projection extending forward of the face-plate or chuck of the lathe-head and in the plane of its axis or spindle, a movable plate pivoted to said projection, a lathe-head mounted upon said movable plate, the described mechanism for moving and adjusting the lathe-head upon said movable plate toward and from the axis of the pivot, and mechanism, as described, for imparting movement to the same movable plate about the axis of the pivot.

NATHAN HUNT.

Witnesses:
H. P. GAMBLE,
PETER AMBLER.